Dec. 15, 1936. J. BRUSSELL Re. 20,204

PINKING APPLIANCE

Original Filed April 18, 1934 3 Sheets-Sheet 1

Dec. 15, 1936. J. BRUSSELL Re. 20,204

PINKING APPLIANCE

Original Filed April 18, 1934 3 Sheets-Sheet 2

Jacob Brussell
INVENTOR

BY William Wolfe
ATTORNEY

Dec. 15, 1936. J. BRUSSELL Re. 20,204

PINKING APPLIANCE

Original Filed April 18, 1934 3 Sheets-Sheet 3

Jacob Brussell

INVENTOR

BY William Wolfe

ATTORNEY

Reissued Dec. 15, 1936 Re. 20,204

UNITED STATES PATENT OFFICE 20,204

PINKING APPLIANCE

Jacob Brussell, New York, N. Y., assignor to Isadore Friedman, Roselle, N. J.

Original No. 2,010,216, dated August 6, 1935, Serial No. 721,085, April 18, 1934. Application for reissue February 21, 1936, Serial No. 65,802

17 Claims. (Cl. 112—122)

Figure 1:
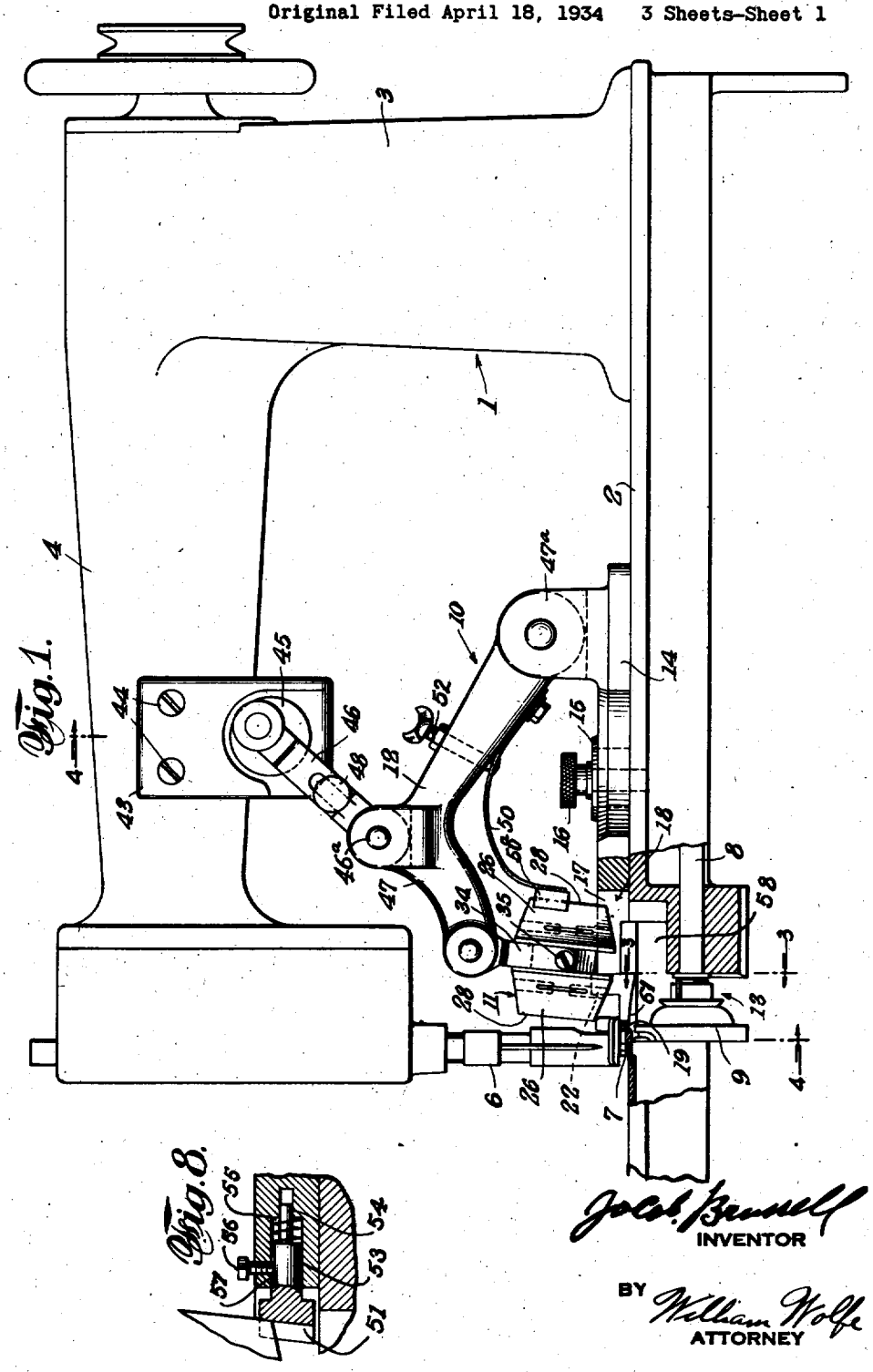

This invention relates to pinking appliances for sewing machines and has for an object the construction of a pinking attachment to be used on and in connection with a sewing machine in order both to sew and pink material simultaneously.

In the pinking attachments used at present with sewing machines the knife edges have dulled quickly necessitating frequent changing of blades and causing much loss in the running time of the machine. This quick dulling of the knife edges is caused by the rubbing of the vertical front edge of the blade against the guide and by the unsteady holding of the blade. Another difficulty has been a clogging of the bobbin and the sewing machine with the waste material cut off by the pinker. The waste material or the cut off pinked pieces accumulate where they are cut and are not forced away and cannot escape by themselves. Thus they accumulate around the hook shaft and bind it and are also forced forward into and bind the bobbin and stop the machine until the hook shaft and bobbin are cleaned out. Another difficulty has been the inability to provide a varying pressure on the knife edge which will insure proper cutting and a minimum of strain on the sewing machine.

The object of my invention is to construct a simple compact strong pinking appliance for a sewing machine. An object is to construct a machine so that the knife blade is both set at a proper angle and guarded in order to prevent undue wear on its cutting edges. At the same time I intend to so construct my knife that it is supplied with numerous cutting edges each of which can be placed in the cutting position by a slight movement not appreciably reducing the operating time of the machine.

Another object of my invention is to construct a varying resilient pressure means for holding the knife wedge against its guide with an increasing pressure on the downward stroke and a decreasing pressure on the up stroke.

A further object of my invention is to construct the under part of the plate or front part of my pinking appliance of such a shape and so position this plate that there is litttle chance of any waste cuttings being forced forward into the bobbin of the machine and stopping it. In addition, I intend to construct as part of the pinking appliance a waste ejector to force all the cuttings away from the bobbin and the hook shaft and the vicinity of all other moving parts of the machine.

In order to accomplish these objects I construct on the sewing machine a pinking appliance having a reversible knife with four cutting wedges. To protect the vertical front edge between the blade faces of the knife I make the angle between the blade faces a little greater than the angle cut from the guide or base plate. To prevent waste from getting into the bobbin and stopping it, I construct the under side of the base plate in the form of a curve to fit closely over the bobbin and to prevent an accumulation of waste from being forced forward into and stopping the bobbin. In addition, I construct a waste ejector on the near end of the bobbin directly under the pinking knife and cut the plate of the sewing machine to permit the waste to fall onto the ejector and be forced thereby from the machine. To provide a varying increasing pressure on the down stroke and a decreasing pressure on the up stroke for holding the knife against the guides, I construct the pinking appliance so that the upper part of the knife wedge proceeds downwardly in a curved path against a downwardly forwardly sloping buffer pad held by a coiled spring.

Further and more specific objects, features and advantages will more clearly appear from the detailed description given below taken in connection with the accompanying sheets of drawings which form a part of this specification.

Figure 2:
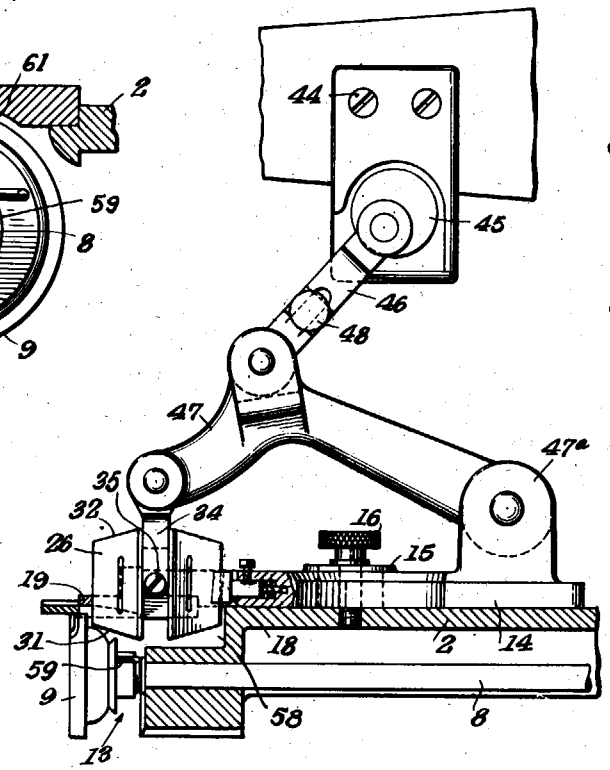
Figure 3:
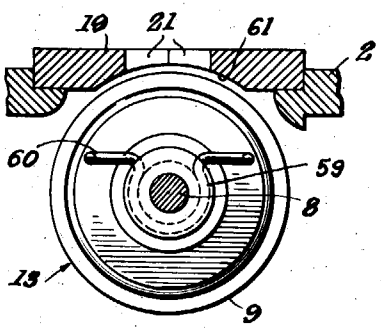
Figure 4:
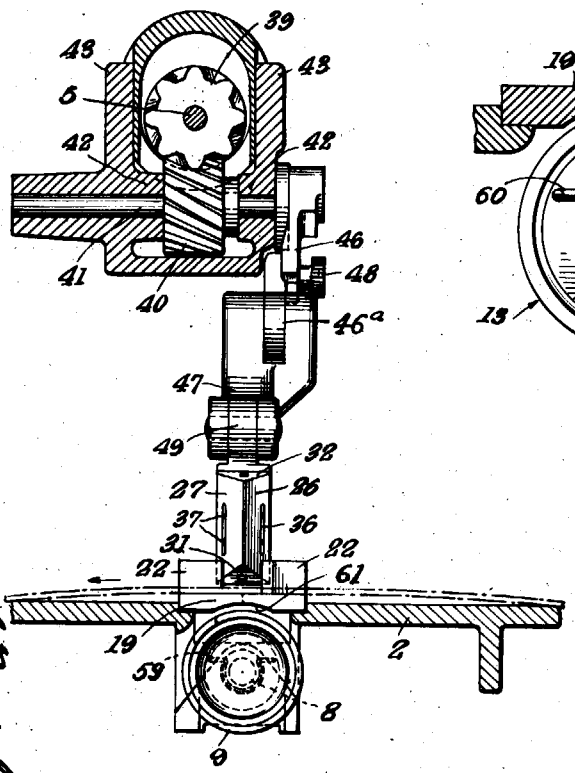
Figure 5:
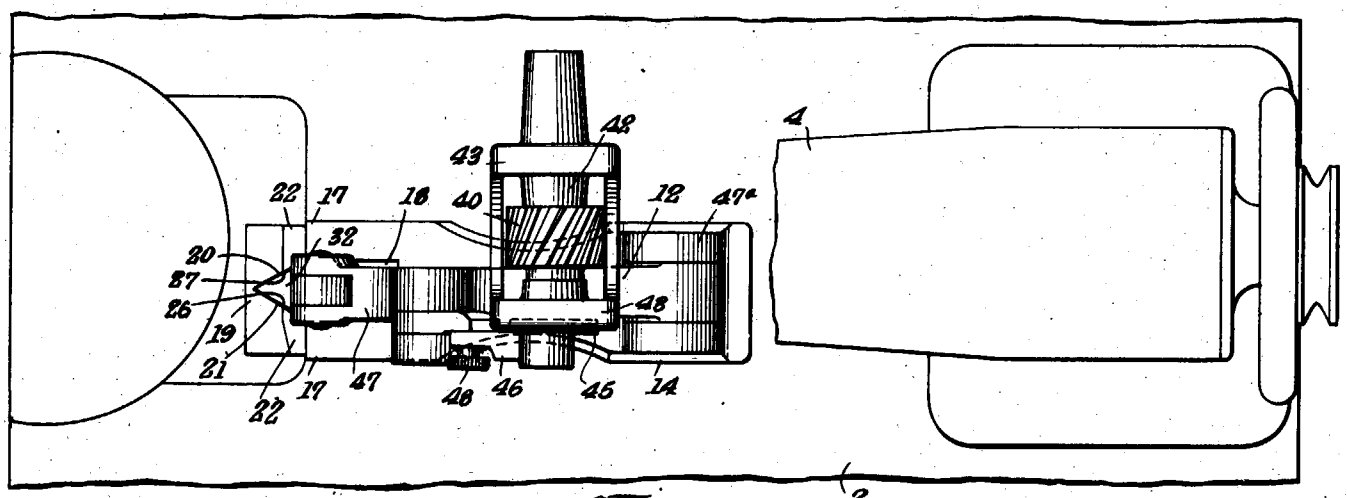
Figure 7:
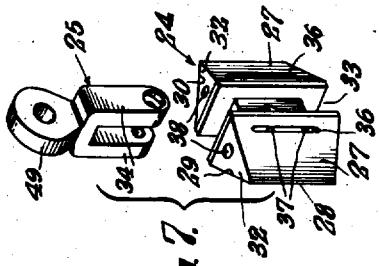
Figure 6:
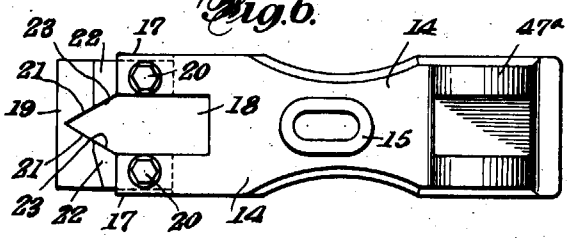

Referring to the drawings, Fig. 1 is an elevation of a sewing machine with my pinking appliance attached, the base part of the machine partly broken away; Fig. 2 is an elevation of my pinking appliance with a modified spring attachment showing the knife in its most downward extended position; Fig. 3 is an enlarged detail section along the line 3—3 of Fig. 1 showing the ejector attachment for the appliance; Fig. 4 is a vertical section along the line 4—4 of Fig. 1; Fig. 5 is a plan view of my invention showing part of a sewing machine in phantom; Fig. 6 is a plan view of the base plate of my appliance; Fig. 7 is a detail showing the knife of my appliance; and Fig. 8 is an enlarged detail of the spring modification.

In the drawings, the sewing machine 1 is constructed in the usual manner with a base plate 2 having the upright 3 at the right hand carrying the horizontal arm 4 which encloses the shaft 5 and holds the needle part 6. The base part of the sewing machine is constructed in the usual manner and has a feed surface 7 and a hook shaft 8 with a hook 9 for holding the bobbin which is not shown.

Attached to the base plate 2 of the sewing machine and geared to its shaft 5 and synchronized with its needle is my pinking appliance 10 to cut off excess material and form a pinked edge at the same time as the machine sews the goods.

My pinking appliance rests on the base plate of the sewing machine near the needle and between the needle and the arm 3. The reciprocating motion necessary to operate the knife part 11 of the appliance is received through an arm eccentric and gear connection 12 with the shaft 5 of the sewing machine. An ejecting part 13 for removing the cut waste material is attached to the hook 9 and rotates with it forcing the waste away from the hook shaft and bobbin.

A base part 14 of my appliance rests on and is held to the base plate of the sewing machine by the washer 15 and screw 16. The base part is provided with an adjusting slot to receive the screw 16 so that the appliance can be properly positioned on the base plate of the sewing machine. To position the appliance in relation to the sewing machine the screw 16 is loosened, the base part is shifted and the screw is then tightened.

The end of the base part 14 near the needle is cut out forming the legs 17 and the cut out open part 18. At the ends of the legs 17 is a plate 19 secured to the base part by the bolts 20 which pass through both the legs 17 and parts of the plate extending under the legs. The plate 19 is cut out in the form of an angle with the apex toward the needle of the machine and near the feed surface 7 and the sides 21 flaring sidewise toward the legs 17, so that the cut out part of the plate attains the same width as the open part between the legs. The plate near its wide cut out part is provided with lugs 22 which butt and extend above the ends of the legs 17. The inner sides 23 of these lugs adjacent the sides 21 are cut flaring in the same manner and form smooth sides which are a continuation of the sides 21. The lug sides 23 act as guides for the reciprocating knife part 11 while the plate 19 and sides 21 act as a shear plate against which the knife part 11 cuts, the knife part reciprocating in its guides in and out of the shear plate and pinks the material as it passes over the plate.

The knife part 11 is comprised of a knife block 24 and the holder 25. The block 24 has a center part and two vertical wedge parts one on either side of the center part. Each of these wedge parts is formed by the convergence of two vertical side faces 26 and 27 which intersect and form the edge 28. The bottom ends of the wedges with the cutting edges 29 and 30 are formed by the faces 31 sloping upward and outward from the center part toward the edges 28 and cutting the two side faces 26 and 27. In a like manner the tops of the wedges are formed similar and opposite to the bottom faces 31 by the faces 32 which slope downward from the center part of the block toward the edges 28. In this way the upper part of the knife block is constructed similar and opposite to the lower part so that the block can be reversed and the upper part used as the lower cutting part. In addition the block may be reversed again, the back wedge being similar to the front wedge. By these reversals four different sets of cutting edges are obtained, the two faces 31 and the two faces 32 may each in turn be placed in the lower front position at which position cutting takes place.

In order for the holder 25 to grasp the block firmly both sides and the top and bottom center part of the block are cut out forming the slot 33 which extends completely around the center part of the block. The holder is constructed with legs 34 which extend into the slot 33 and are attached to the block by the pin 35 which passes through the center of the block and the ends of the legs. The position of the pin 35 at the center of the block permits the block to be turned around and inverted in the holder and so allows all the various wedge faces to be placed in the cutting position.

The edges formed by the intersection of the faces 26 and 27 with the faces 31 and 32 are the cutting edges and cut or shear in conjunction with the top and sides 21 of the plate. The angle between the intersecting faces 26 and 27 is slightly greater than the angle between the cut out sides 21 of the plate and lugs 23 so that the wedge is held a little back from being an exact fit in the cut out part and the edge 28 is held a little away from the intersection of the cut out sides 21. In this way the edge 28 retains its sharpness being prevented from wearing and the lugs 23 act as guides and hold the wedge in its proper position.

The faces 26, 27, 31 and 32 are lubricated by a system of grooves and holes. There is a groove 36 in each of the faces 26 and 27 and holes 37 extend in the grooves through the block from the face 26 to the face 27. The holes 37 are intersected by holes 38 extending from the faces 32 through the block to the faces 31. In this way all the faces of the block are lubricated by the simple application of lubricant to each of the holes 38 and the sides 21 of the plate receive lubrication by contact with the lubricated faces.

The transfer of the rotary movement of the shaft 5 of the sewing machine to the reciprocating motion of the knife block is accomplished by means of the gear 39 on the shaft 5 meshing with the gear 40 on the shaft 41. The ratio of the gear 39 to the gear 40 is two to one which causes the needle of the sewing machine and the knife of the appliance to sew and cut the material at the same rate of speed. The shaft 41 turns in the bearings 42 which also form a housing for the shaft and gears and in addition act as a grease or oil pocket and contain lubricant for the gears. The bearings have side parts 43 which extend upward part way around the arm 4 and are held to the arm 4 by the screws 44.

The rotary motion of the shaft 41 is transferred by an eccentric 45 at the end of the shaft 41 to a reciprocating motion in the arm 46. The length of the arm 46 is adjustable being in two lapping parts and held together by the thumb screw 48. The length of the arm is adjusted to correspond to the various positions of the base plate which can be moved relative to the position of the needle in order to vary the width of the pinked margin left after cutting.

The arm 46 is pivotally held at 46*a* to the arm 47 intermediate the ends. One of the ends of the arm 47 is pivotally connected at 47*a* to the part of the base plate 14 removed from the cut out portion, and the other end of the arm forms a pin joint 49 with the upper part of the knife holder. Thus the reciprocating motion of the arm 46 is transferred through the arm 47 to an up and down motion in the knife part. As the lower end of the knife is held against the guides at all times the cutting face has a vertical reciprocating motion while the upper end of the knife holder and pin joint 49 have a rotary motion about 47*a* which is composed of a reciprocating horizontal motion from a position in a vertical line with the guides toward the right as well as the up and down motion of the cutting face.

In Fig. 1 a flat spring 50 extends from the arm 47 against the rear faces 26 and 27 of the knife block and pad 50a of the spring provides the contact against either face 26 or 27 so as not to injure the edge 28. The lower part of the front face 51 of the pad 50a slopes downward and forward toward the knife wedge so that as the wedge descends against the face 51 an increasing pressure is exerted by the spring and as the knife wedge rises out of the lower part of the face the pressure is decreased. A screw 52 extends through the arm 47 and the spring 50 and holds the spring in compression. The spring is bent bow shaped so that tightening the screw increases the tension in the spring and pushes the knife block forward against the guides or sides 21 of the plate. As the knife descends the spring causes an increasing pressure due to the horizontal component of the travel toward the right of the upper part of the knife block and as the knife block is raised the opposite movement with a corresponding decreasing pressure takes place. The increasing pressure on the down stroke tends to insure even clean cutting while the decreasing and weakened pressure on the up stroke reduces the strain on the sewing machine. The best results occur when the strongest pressure of the spring coincides with the position of the eccentric furthest from dead center. A modification is shown in Fig. 2 which has the coiled spring 52 in place of the flat spring 50. The rear of the pad 50a in this case is connected to the arm 53 which has a narrowed part 54 over which the coiled spring 52 extends. A recess 55 is provided in the plate 14 into which the arm 53 extends and against the end of which one end of the coiled spring rests. A screw 56 extends through the plate 14 into a slot 57 in the arm 53 and guides the movement of the spring, arm and pad.

In order to dispose of the cut waste material the base plate 2 of the sewing machine is provided with the cut out part 58 which corresponds to but is bigger than the cut out part 18 of the appliance and permits the lower part of the plate 19 to rest in the cut out part 58 and the base plate 14 to rest on the base plate 2 of the machine. The waste falls through the cut out parts 18 and 58 and is removed by the ejector 59 which pushes the waste outward and downward from the machine parts and prevents the clogging of the space around the hook shaft and from getting in between the end part of the base part of the appliance and the hook 9. The ejector 59 which is placed on the rear part of the hook directly below the cut out parts 58 and 18, being of resilient metal, snaps over the rear end of the hook and extends sidewise and then forward as at 60 toward the hook. The ejector may be screwed or joined to the hook in any other suitable manner and may be of a different shape from the one illustrated and described. The rotating movement of the hook shaft is imparted to the ejector and causes the ejector to push the cut out material sidewise and downward so that it falls away from the hook shaft and other moving parts.

In order to prevent any of the waste material from accumulating between the hook and the under part of the base part 14 the under part of the part 14 is cut out in an arcuate form 61 similar to the shape of the hook thus reducing the space between the base plate 14 and the hook and allowing little possibility of waste entering and clogging the hook and bobbin of the machine.

While I have described my improvements in great detail and with respect to a preferred form thereof, I do not desire to be limited to such details and forms since many changes and modifications may be made and the invention embodied in widely different forms without departing from the spirit and scope thereof in its broader aspects. Hence I desire to cover all modifications, forms and embodiments coming within the language or scope of any one or more of the appended claims.

I claim:

1. A pinking appliance for a sewing machine having a knife, a means for transferring the rotary movement of the shaft of the sewing machine into a reciprocal movement of the knife, a base plate, sides in said base plate forming an opening therein and co-acting with said knife for cutting, and ejector means on the hook shaft of the sewing machine beneath said opening to remove from the hook waste as it falls through said opening.

2. A pinking appliance for a sewing machine having a knife, a means for transferring the rotary movement of the shaft of the sewing machine into a reciprocal movement of the knife, a base plate, said base plate having a curved under part corresponding to the curve of the hook and permitting the close approach of the upper part of the hook to the under part of the plate, inner sides in said base plate forming an opening therein and co-acting with said knife for shearing, and ejector means on the hook shaft of the sewing machine beneath the opening.

3. A knife for use in a pinking appliance for a sewing machine having a mid portion, two side faces extending from the mid portion converging to an edge, a bottom face sloping upwardly outwardly intersecting the two side faces to form a cutting wedge, a top face sloping downwardly outwardly intersecting the two side faces to form a second cutting wedge, a second set of side faces extending from the mid portion opposite and similar to said first mentioned set of side faces and top and bottom faces corresponding to and opposite to said first mentioned top and bottom faces intersecting said second set of side faces to form a third and fourth cutting wedge.

4. A knife for use in a pinking appliance for a sewing machine having a mid portion, two side faces extending from the mid portion converging to an edge, a bottom face intersecting the two side faces to form a set of cutting edges, a top face intersecting the two side faces to form a second set of cutting edges, a second set of side faces extending from the mid portion opposite and similar to said first mentioned set of side faces and top and bottom faces corresponding and opposite to said first mentioned top and bottom faces intersecting said second set of side faces to form a third and fourth set of cutting edges.

5. A pinking appliance for a sewing machine having a knife, a means for transferring the circular motion of the sewing machine shaft to a reciprocal motion in the knife, a guide against which the knife shears, a spring forcing the knife against the guide and a buffer contact piece for said spring having a forwardly downwardly sloping face over which the knife travels giving an increasing pressure to the knife on its downward stroke and a decreasing pressure to the knife on its upward stroke against the knife guide.

6. A pinking appliance for a sewing machine having a knife, a means for transferring the rotary movement of the shaft of a sewing machine into a reciprocal movement of the knife, a base plate, sides in said base plate forming an opening therein and co-acting with said knife for cutting, a spring means between said base plate and knife and co-acting with said knife to force said knife forward, and guide means co-acting with said spring means for positioning said knife.

7. A knife for use in a pinking appliance for a sewing machine having a grooved mid portion, said mid portion having a hole through its center, two side faces extending from the mid portion converging to an edge, a bottom face sloping upwardly outwardly intersecting the two side faces to form a cutting wedge, a top face sloping downwardly outwardly intersecting the two side faces to form a second cutting wedge, a second set of side faces extending from the mid portion opposite and similar to said first mentioned set of side faces and top and bottom faces corresponding to and opposite to said first mentioned top and bottom faces, intersecting said second set of side faces to form a third and fourth cutting wedge, a forked holding element extending into said grooved mid portion and having openings corresponding to the hole in the mid portion and a pin fitting into the hole and openings in said forked element and mid portion.

8. A pinking appliance for a sewing machine having a knife, a means for transferring the rotary movement of the shaft of the sewing machine into a reciprocal movement of the knife, a base plate, sides in said base plate forming an opening therein and co-acting with said knife for cutting, and a wire bent into an arcuate form with projecting ends mounted on the hook shaft of the sewing machine beneath said opening for ejecting the waste material.

9. A pinking appliance for a sewing machine having a knife, a means for transferring the rotary movement of the shaft of the sewing machine into a reciprocal movement of the knife, a base plate, said base plate having a curved under part corresponding to the curve of the hook of the sewing machine and permitting the close approach of the upper part of the hook to the under part of the plate.

10. A trimming mechanism for sewing machines comprising a base, an arm pivoted on said base, means for reciprocating said arm, a knife pivoted at the free end of said arm, a ledger blade cooperating with said knife, a spring freely suspended with one end on said arm and the other end operatively connected with said knife, and means on top of said arm and extending through the same in operative contact with said spring for adjusting the tension of said spring to vary the pressure between said knife and blade.

11. A trimming mechanism for sewing machines comprising a base, an arm pivoted on said base, means for reciprocating said arm, a knife pivoted at the free end of said arm, a ledger blade cooperating with said knife, a spring freely suspended with one end on said arm and the other end operatively connected with said knife, and means on top of said arm and extending through the same in operative contact with said spring for adjusting the tension of spring to vary the pressure between said knife and blade including a screw threaded member and means thereon for facilitating the rotation thereof by the fingers.

12. A trimming mechanism for sewing machines comprising a base, an arm pivoted on said base, means for reciprocating said arm, a knife pivoted at the free end of said arm, a ledger blade cooperating with said knife, a spring freely suspended with one end on said arm and the other end operatively connected with said knife, and means on said arm for adjusting the tension of said spring to vary the pressure between said knife and blade, said means being located at a point to the rear of the knife and of said reciprocating means for said arm.

13. A combined pinking mechanism and sewing machine comprising a base, an arm pivoted on said base, means for reciprocating said arm, a knife operated by said arm, a ledger blade cooperating with said knife to cut pieces of fabric, stitch forming mechanism including a hook and hook shaft, and an ejector secured on said shaft and rotatable thereby, said ejector extending immediately below the opening of said ledger blade and adapted to be rotated in close proximity to said ledger blade.

14. A combined pinking mechanism and sewing machine comprising a base, an arm pivoted on said base, means for reciprocating said arm, a knife operated by said arm, a ledger blade cooperating with said knife to cut pieces of fabric, stitch forming mechanism including a hook and hook shaft, and an ejector secured on said shaft and rotatable thereby, said ejector extending immediately below the opening of said ledger blade and adapted to be rotated in close proximity to said ledger blade, said ejector being of resilient metal character.

15. A trimming mechanism for sewing machines comprising a base, an arm pivoted on said base, means for reciprocating said arm, a knife pivoted at the free end of said arm, a ledger blade cooperating with said knife, a spring on said arm operatively connected with said knife, said connection being adapted to force said knife against said blade with an increasing pressure on the downward stroke of said knife.

16. A trimming mechanism for sewing machines comprising a base, an arm pivoted on said base, means for reciprocating said arm, a knife pivoted at the free end of said arm, a ledger blade cooperating with said knife, a spring on said arm operatively connected with said knife, said connection being adapted to force said knife against said blade with an increasing pressure on the downward stroke of said knife, said stroke tending to bend said spring.

17. A pinking appliance for a sewing machine having a knife, a means for transferring the rotary movement of the shaft of the sewing machine into a reciprocal movement of the knife, a base plate, sides in said base plate forming an opening therein and co-acting with said knife for cutting, and ejector means on the hook shaft of the sewing machine beneath said opening and in the path of the waste falling down from said opening.

JACOB BRUSSELL.